(12) United States Patent
Qiu et al.

(10) Patent No.: US 11,949,272 B2
(45) Date of Patent: Apr. 2, 2024

(54) POWER SUPPLY CIRCUIT OF TERMINAL DEVICE, TERMINAL DEVICE, AND POWER SUPPLY METHOD

(71) Applicant: Honor Device Co., Ltd., Guangdong (CN)

(72) Inventors: Yupeng Qiu, Beijing (CN); Ruiliang Li, Beijing (CN); Haibin Zhou, Beijing (CN); Fenwei Zhang, Beijing (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 644 days.

(21) Appl. No.: 17/259,045

(22) PCT Filed: Jul. 27, 2018

(86) PCT No.: PCT/CN2018/097431
§ 371 (c)(1),
(2) Date: Jan. 8, 2021

(87) PCT Pub. No.: WO2020/019300
PCT Pub. Date: Jan. 30, 2020

(65) Prior Publication Data
US 2021/0273475 A1 Sep. 2, 2021

(51) Int. Cl.
*H02J 7/00* (2006.01)

(52) U.S. Cl.
CPC .. *H02J 7/007182* (2020.01); *H02J 7/007194* (2020.01); *H02J 2207/10* (2020.01); *H02J 2310/22* (2020.01)

(58) Field of Classification Search
CPC ........... H02J 7/007182; H02J 7/007194; H02J 2207/10; H02J 2310/22; H02J 2207/20; H02J 7/0063
See application file for complete search history.

(56) References Cited

U.S. PATENT DOCUMENTS

| | | | |
|---|---|---|---|
| 7,274,116 B2* | 9/2007 | Inoue | H02J 7/007182 307/100 |
| 7,830,108 B2 | 11/2010 | Rumpf | |
| 7,911,811 B2 | 3/2011 | Wheeler et al. | |
| 8,633,677 B2* | 1/2014 | Kim | H01M 10/441 320/140 |

(Continued)

FOREIGN PATENT DOCUMENTS

| | | |
|---|---|---|
| CN | 1536734 A | 10/2004 |
| CN | 1701482 A | 11/2005 |

(Continued)

*Primary Examiner* — Richard V Muralidar
(74) *Attorney, Agent, or Firm* — Conley Rose, P.C.

(57) ABSTRACT

A power supply circuit of a terminal device includes a voltage boost circuit, a battery chip, and a controller. The battery chip is configured to provide an output voltage of a battery for a load. An input end of the voltage boost circuit is connected to a positive electrode of the battery, and an output end of the voltage boost circuit is connected to the load. The output voltage of the battery is boosted when the temperature is relatively low or the output voltage of the battery is relatively low. In addition, when a relatively high pulse current occurs on the terminal and the output voltage of the voltage boost circuit is stepped down, both the battery chip and the voltage boost circuit is controlled to supply power to the load.

13 Claims, 8 Drawing Sheets

(56) References Cited

U.S. PATENT DOCUMENTS

| | | | |
|---|---|---|---|
| 9,076,406 B2 | 7/2015 | Seo | |
| 9,104,212 B2 * | 8/2015 | Wei | H01M 10/425 |
| 2006/0006850 A1 * | 1/2006 | Inoue | H02J 7/00718 |
| | | | 323/265 |
| 2006/0119322 A1 | 6/2006 | Maleki et al. | |
| 2008/0054855 A1 | 3/2008 | Hussain et al. | |
| 2008/0273353 A1 | 11/2008 | Rumpf | |
| 2010/0244797 A1 | 9/2010 | Tabata et al. | |
| 2014/0043007 A1 * | 2/2014 | Wei | G05F 5/00 |
| | | | 323/299 |
| 2015/0311738 A1 | 10/2015 | Odaohhara et al. | |
| 2015/0364997 A1 | 12/2015 | Deng | |
| 2016/0105045 A1 | 4/2016 | Kabasawa et al. | |
| 2016/0105405 A1 | 4/2016 | Chew | |
| 2021/0273475 A1 | 9/2021 | Qiu et al. | |

FOREIGN PATENT DOCUMENTS

| | | |
|---|---|---|
| CN | 1989026 A | 6/2007 |
| CN | 201349211 Y | 11/2009 |
| CN | 102496042 A | 6/2012 |
| CN | 102543022 A | 7/2012 |
| CN | 103181054 A | 6/2013 |
| CN | 103545865 A | 1/2014 |
| CN | 103872715 A | 6/2014 |
| CN | 104009529 A | 8/2014 |
| CN | 103181054 B | 11/2015 |
| CN | 204886326 U | 12/2015 |
| CN | 105337374 A | 2/2016 |
| CN | 105978055 A | 9/2016 |
| CN | 107359654 A | 11/2017 |
| CN | 107783580 A | 3/2018 |
| CN | 207098681 U | 3/2018 |
| CN | 108258904 A | 7/2018 |
| CN | 108267972 A | 7/2018 |
| CN | 111316528 B | 11/2022 |
| JP | 2003189485 A | 7/2003 |
| JP | 2006081369 A | 3/2006 |
| JP | 2007529185 A | 10/2007 |
| JP | 2014524232 A | 9/2014 |
| RU | 2204204 C2 | 5/2003 |
| RU | 2540803 C2 | 2/2015 |
| TW | 200950296 A | 12/2009 |
| WO | 2016188070 A1 | 12/2016 |

* cited by examiner

POWER SUPPLY CIRCUIT OF TERMINAL DEVICE, TERMINAL DEVICE, AND POWER SUPPLY METHOD

CROSS-REFERENCE TO RELATED APPLICATIONS

This application is a U.S. National Stage of International Patent Application No. PCT/CN2018/097431 filed on Jul. 27, 2018, which is hereby incorporated by reference in its entirety.

TECHNICAL FIELD

This application relates to the field of terminal device technologies, and in particular, to a power supply circuit of a terminal device, a terminal device, and a power supply method.

BACKGROUND

Currently, most terminal devices such as mobile phones and iPads are powered by batteries. When a voltage of a battery is relatively low or a terminal device is used in a low-temperature scenario, for example, during photographing or video recording, a problem of abnormal shutdown or restart frequently occurs.

Because the terminal device needs to consume a relatively high current during photographing, an output voltage of the battery sharply drops, and severely, the terminal device is instantaneously shut down without a prompt of a low battery level. Consequently, user experience is deteriorated.

Likewise, when an ambient temperature is low, a temperature of the battery is also low. However, internal resistance exists in the battery. Therefore, when the temperature of the battery is relatively low, the internal resistance of the battery increases, and the output voltage of the battery drops. Consequently, abnormal shutdown is caused.

SUMMARY

This application provides a power supply circuit of a terminal device, a terminal device, and a power supply method, to prevent the terminal device from being abnormally shut down or restarted when an output voltage of a battery is relatively low or a temperature is relatively low.

According to a first aspect, a power supply circuit of a terminal device is provided, including a voltage boost circuit, a battery chip, and a controller.

A battery end of the battery chip is connected to a positive electrode of a battery, and an electric energy output end of the battery chip is connected to a load. The battery chip is configured to provide an output voltage of the battery for the load.

An input end of the voltage boost circuit is connected to the positive electrode of the battery, and an output end of the voltage boost circuit is connected to the load. The voltage boost circuit can boost an input voltage and then output a boosted voltage.

The controller is configured to: when a sampling temperature is less than a preset temperature value and/or the output voltage of the battery is less than a first preset voltage value, control the voltage boost circuit to work and control the battery chip to stop supplying power to the load; and when an output voltage of the voltage boost circuit is less than an input voltage of the voltage boost circuit, control the battery chip and the voltage boost circuit to simultaneously supply power to the load, where the sampling temperature is a temperature of the terminal device or a temperature of the battery.

In a first possible implementation of the first aspect, the power supply circuit further includes a voltage comparison circuit.

The controller is further configured to control the voltage comparison circuit to work when controlling the voltage boost circuit to work.

The voltage comparison circuit is configured to: compare the output voltage of the voltage boost circuit with the input voltage of the voltage boost circuit; and send a trigger signal to the controller when determining that the output voltage of the voltage boost circuit is less than the input voltage of the voltage boost circuit.

The controller is further configured to: when receiving the trigger signal, control the battery chip and the voltage boost circuit to simultaneously supply power to the load.

The voltage comparison circuit can obtain a difference between the output voltage and the input voltage of the voltage boost circuit.

The voltage comparison circuit may he any circuit or chip that implements the foregoing functions. For example, the voltage comparison circuit may be implemented by a comparator and a peripheral building resistor. The foregoing difference is calculated by using resistors with different resistance values.

To ensure that a power supply status of the battery chip is not frequently controlled and improve an anti-interference capability, in this embodiment, whether to trigger the battery chip and the voltage boost circuit to simultaneously supply power to the load is determined by the voltage comparison circuit. The voltage comparison circuit sends the trigger signal to the controller only when the output voltage of the voltage boost circuit is less than the input voltage of the voltage boost circuit. Alternatively, the voltage comparison circuit sends the trigger signal to the controller only when the output voltage of the voltage boost circuit is less than the input voltage of the voltage boost circuit and the difference between the two voltages exceeds a first threshold.

The voltage comparison circuit may be disposed inside the battery chip, or may be disposed outside the battery chip.

With reference to the first aspect and the foregoing possible implementation, in a second possible implementation, the voltage comparison circuit is disposed inside the battery chip, or the voltage comparison circuit is disposed outside the battery chip.

With reference to the first aspect and any one of the foregoing possible implementations, in a third possible implementation, the battery chip includes a switching tube.

A first end of the switching tube is connected to the batted end of the battery chip, and a second end of the switching tube is connected to the electric energy output end of the battery chip.

That the controller controls the battery chip to supply power to the load is specifically: the controller controls the switching tube to be closed.

With reference to the first aspect and any one of the foregoing possible implementations, in a fourth possible implementation, the controller is further configured to: when it is detected that a charger is inserted into the terminal device, control the battery chip to supply power to the load, and control the voltage boost circuit to stop working.

When the charger is inserted into the terminal device, the load is directly powered by the charger.

With reference to the first aspect and any one of the foregoing possible implementations, in a fifth possible implementation, the controller is further configured to: after the controller controls the voltage boost circuit to work and controls the battery chip to stop supplying power to the load, when a screen of the terminal device is turned off and the output voltage of the battery is greater than a second preset voltage value, control the output voltage of the voltage boost circuit to be less than or equal to the output voltage of the battery, then control the battery chip to supply power to the load, and next control the voltage boost circuit to stop working.

The second preset voltage value is less than the first preset voltage value.

When the screen of the terminal device is turned off, required power decreases. Therefore, even if the output voltage of the battery is less than the first preset voltage value, the voltage boost circuit may be controlled to stop working and the battery chip works to provide a power supply path for the load, provided that the output voltage of the battery is greater than the second preset voltage value.

With reference to the first aspect and any one of the foregoing possible implementations, in a sixth possible implementation, the controller is further configured to: after the controller controls the voltage boost circuit to stop working, when the screen of the terminal device is turned off and the output voltage of the battery is less than or equal to the second preset voltage value, control the voltage boost circuit to work and control the battery chip to stop supplying power to the load.

With reference to the first aspect and any one of the foregoing possible implementations, in a seventh possible implementation, the controller is further configured to control the terminal device to be shut down when the output voltage of the battery is less than or equal to a third preset voltage value.

The third preset voltage value is less than the second preset voltage value.

With reference to the first aspect and any one of the foregoing possible implementations, in an eighth possible implementation, that the controller controls the voltage boost circuit to work and controls the battery chip to stop supplying power to the load specifically includes:

When the terminal device just switches from a power supply path provided by the battery chip to a power supply path provided by the voltage boost circuit, if the output voltage of the voltage boost circuit is relatively high, but the power supply path provided by the battery chip is not disconnected, the relatively high output voltage may be backflowed into the battery chip. To avoid such a backflow, the output voltage of the voltage boost circuit is first controlled to be less than or approximate to (for example, equal to or slightly greater than) the output voltage of the battery, then the battery chip is controlled to stop supplying power to the load, and next the output voltage of the voltage boost circuit is controlled to be a fourth preset voltage value. The fourth preset voltage value is less than the first preset voltage value.

With reference to the first aspect and any one of the foregoing possible implementations, in a ninth possible implementation, the voltage boost circuit is a boost circuit or a charge pump circuit.

With reference to the first aspect and any one of the foregoing possible implementations, in a tenth possible implementation, the power supply circuit further includes a power management chip.

The power management chip is configured to: determine that the sampling temperature is less than the preset temperature value and/or the output voltage of the battery is less than the first preset voltage value; and send the determining result to the controller.

With reference to the first aspect and any one of the foregoing possible implementations, in an eleventh possible implementation, the controller is implemented by a system-on-a-chip of the terminal device.

According to the power supply circuit provided in the foregoing embodiment, the controller needs to control working states of the battery chip and the voltage boost circuit. The following provides a power supply circuit, so that switching between power supply paths can be automatically performed based on an output voltage of a battery without a need of control. This is simple and convenient, and further reduces control costs. A difference between the voltage boost circuit in the following embodiment and the voltage boost circuit in the foregoing embodiment is that a bypass circuit is added.

According to a second aspect, a power supply circuit of a terminal device is provided, including a voltage boost circuit, a battery chip, and a controller.

A battery end of the battery chip is connected to a positive electrode of a battery, and an electric energy output end of the battery chip is connected to a load. The battery chip is configured to provide an output voltage of the battery for the load.

The voltage boost circuit has a bypass circuit. An input end of the voltage boost circuit is connected to the positive electrode of the battery, and an output end of the voltage boost circuit is connected to the load. The voltage boost circuit can boost an input voltage and then output a boosted voltage. A first end of the bypass circuit is connected to the input end of the voltage boost circuit, and a second end of the bypass circuit is connected to the output end of the voltage boost circuit. A conducting state of the voltage boost circuit is complementary to that of the bypass circuit.

The controller is configured to: when a sampling temperature is less than a preset temperature value and/or the output voltage of the battery is less than a first preset voltage value, control the voltage boost circuit to work and control the battery chip to stop supplying power to the load. When an output voltage of the voltage boost circuit is less than an input voltage of the voltage boost circuit, the bypass circuit is automatically conducted to supply power to the load. The sampling temperature is a temperature of the terminal device or a temperature of the battery.

In a first possible implementation of the second aspect, the controller is further configured to: when it is detected that a charger is inserted into the terminal device, control the battery chip to supply power to the load, and control the voltage boost circuit to stop working.

With reference to the second aspect and the foregoing possible implementation, in a second possible implementation, the controller is further configured to: after the controller controls the voltage boost circuit to work and controls the battery chip to stop supplying power to the load, when a screen of the terminal device is turned off and the output voltage of the battery is greater than a second preset voltage value, control the output voltage of the voltage boost circuit to be less than or equal to the output voltage of the battery, then control the battery chip to supply power to the load, and next control the voltage boost circuit to stop working.

The second preset voltage value is less than the first preset voltage value.

With reference to the second aspect and any one of the foregoing possible implementations, in a third possible implementation, the controller is further configured to: after the controller controls the voltage boost circuit to stop working, when the screen of the terminal device is turned off and the output voltage of the battery is less than or equal to the second preset voltage value, control the voltage boost circuit to work and control the battery chip to stop supplying power to the load.

With reference to the second aspect and any one of the foregoing possible implementations, in a fourth possible implementation, the controller is further configured to control the terminal device to be shut down when the output voltage of the battery is less than or equal to a third preset voltage value.

The third preset voltage value is less than the second preset voltage value.

With reference to the second aspect and any one of the foregoing possible implementations, in a fifth possible implementation, that the controller controls the voltage boost circuit to work and controls the battery chip to stop supplying power to the load specifically includes:

first controlling the output voltage of the voltage boost circuit to be less than or approximate to (for example, equal to or slightly greater than) the output voltage of the battery, then controlling the battery chip to stop supplying power to the load, and next controlling the output voltage of the voltage boost circuit to be a fourth preset voltage value.

The fourth preset voltage value is less than the first preset voltage value.

With reference to the second aspect and any one of the foregoing possible implementations, in a sixth possible implementation, the voltage boost circuit is a boost circuit or a charge pump circuit.

With reference to the second aspect and any one of the foregoing possible implementations, in a seventh possible implementation, the power supply circuit further includes a power management chip.

The power management chip is configured to: determine that the sampling temperature is less than the preset temperature value and/or the output voltage of the battery is less than the first preset voltage value; and send the determining result to the controller.

With reference to the second aspect and any one of the foregoing possible implementations, in an eighth possible implementation, the controller is implemented by a system-on-a-chip of the terminal device.

With reference to the second aspect and any one of the foregoing possible implementations, in a ninth possible implementation, that a conducting state of the voltage boost circuit is complementary to that of the bypass circuit specifically includes: the bypass circuit is not conducted when the voltage boost circuit is conducted; or the voltage boost circuit is not conducted when the bypass circuit is conducted.

According to a third aspect, a terminal device is provided, including a battery, a load, and the power supply circuit provided in the first aspect or the second aspect.

The power supply circuit is configured to provide electric energy of the battery for the load.

According to a fourth aspect, a power supply method for a terminal device is provided. The method is applied to the terminal device. The terminal device includes a battery, a load, and a power supply circuit. The power supply circuit includes a voltage boost circuit, a battery chip, and a controller. A battery end of the battery chip is connected to a positive electrode of the battery, and an electric energy output end of the battery chip is connected to the load. The battery chip is configured to provide an output voltage of the battery for the load. An input end of the voltage boost circuit is connected to the positive electrode of the battery, and an output end of the voltage boost circuit is connected to the load.

The method includes:

when a sampling temperature is less than a preset temperature value and/or the output voltage of the battery is less than a first preset voltage value, controlling, by the controller, the voltage boost circuit to work and controlling the battery chip to stop supplying power to the load, where the sampling temperature is a temperature of the terminal device or a temperature of the battery; and in a working process of the voltage boost circuit, when an output voltage of the voltage boost circuit is less than an input voltage of the voltage boost circuit, controlling the battery chip and the voltage boost circuit to simultaneously supply power to the load.

According to a fifth aspect, a power supply method for a terminal device is further provided. The method is applied to the terminal device. The terminal device includes a battery, a load, and a power supply circuit. The power supply circuit includes a voltage boost circuit, a battery chip, and a controller. A battery end of the battery chip is connected to a positive electrode of the battery, and an electric energy output end of the battery chip is connected to the load. The battery chip is configured to provide an output voltage of the battery for the load. An input end of the voltage boost circuit is connected to the positive electrode of the battery, and an output end of the voltage boost circuit is connected to the load. The voltage boost circuit has a bypass circuit. A first end of the bypass circuit is connected to the input end of the voltage boost circuit, and a second end of the bypass circuit is connected to the output end of the voltage boost circuit. A conducting state of the voltage boost circuit is complementary to that of the bypass circuit.

The method includes:

when a sampling temperature is less than a preset temperature value and/or the output voltage of the battery is less than a first preset voltage value, controlling, by the controller, the voltage boost circuit to work and controlling the battery chip to stop supplying power to the load; and in a working process of the voltage boost circuit, when an output voltage of the voltage boost circuit is less than an input voltage of the voltage boost circuit, enabling the bypass circuit to be automatically conducted to supply power to the load, where the sampling temperature is a temperature of the terminal device or a temperature of the battery.

It can be learned from the foregoing technical solutions that embodiments of this application have the following advantages.

The voltage boost circuit is added to the terminal device. When it is determined that the sampling temperature is less than the preset temperature value and/or the output voltage of the battery is less than a preset voltage value, the voltage boost circuit is controlled to work. When the output voltage of the voltage boost circuit is less than the input voltage of the voltage boost circuit, the battery chip and the voltage boost circuit are controlled to simultaneously supply power to the load. The sampling temperature is the temperature of the terminal device or the temperature of the battery. Therefore, according to the power supply circuit provided in the embodiments of this application, when the temperature of the terminal device is relatively low and/or the output voltage of the battery is relatively low, the output voltage of the battery may be boosted and then a boosted voltage is provided for the load. In this way, a power demand of the load is met, and abnormal shutdown or restart caused when the load requires a high current is avoided. According to the technical solutions provided in the embodiments of this application, user experience can be improved, and remaining power of the battery can be further fully used. Because of existence of the voltage boost circuit, a battery voltage value corresponding to shutdown of the terminal device may be further reduced, thereby prolonging a run time of the terminal device. In addition, even if the voltage boost circuit is working, the output voltage of the voltage boost circuit may be stepped down as a relatively high pulse current occurs on the load. In this case, the controller in this application may control both the battery chip and the voltage boost circuit to supply power to the load. In other words, two power supply paths are conducted. In this way, a power supply current can be increased, to meet a requirement of the load for a high current.

DESCRIPTION OF EMBODIMENTS

Figure 1:
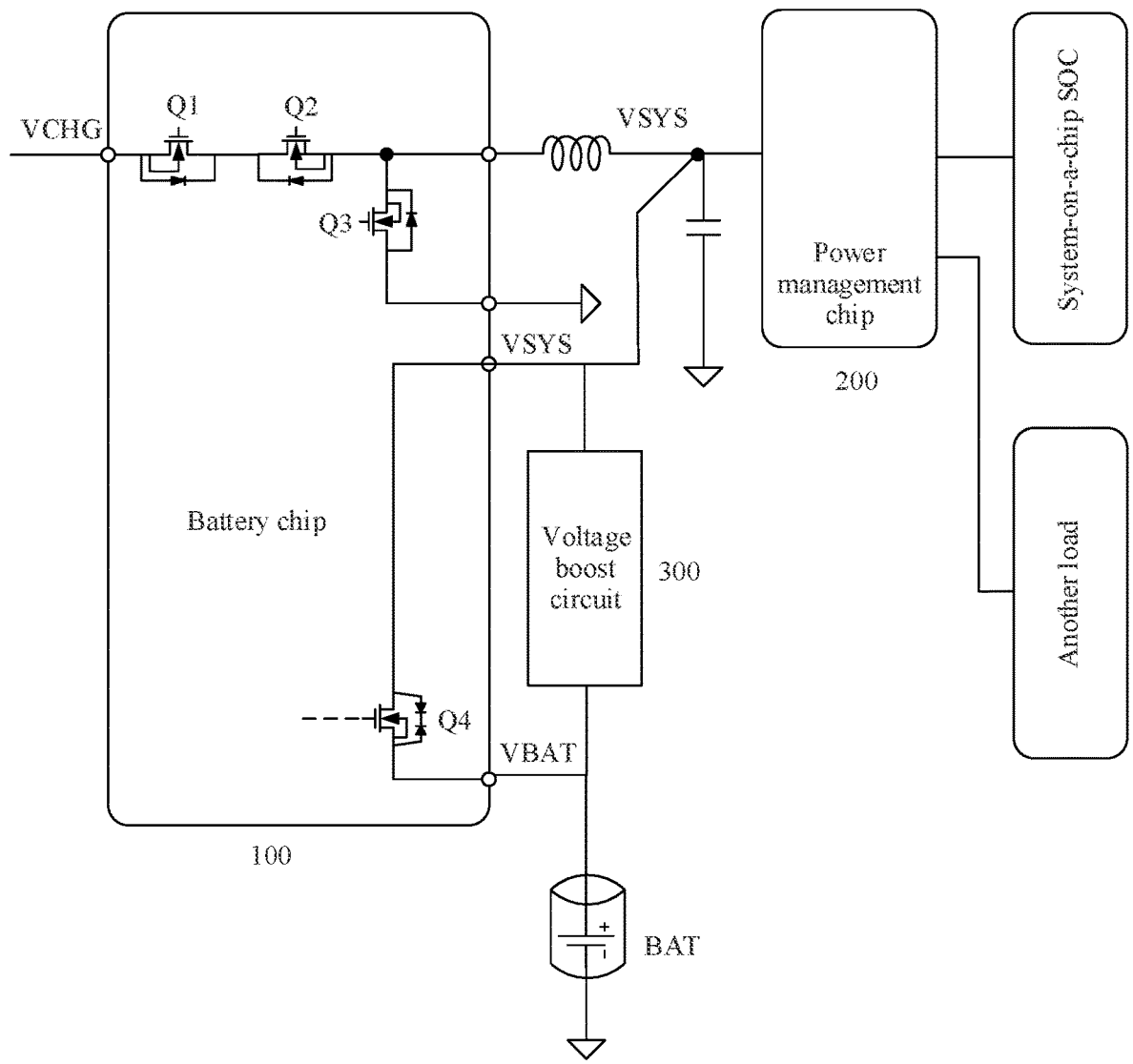
FIG. 1 is a schematic diagram of a power supply circuit of a terminal device according to an embodiment of this application.

To make persons skilled in the art better understand the technical solutions provided in the embodiments of this application, the following first describes a power supply circuit of a terminal device.

Embodiment 1 of the Power Supply Circuit

A specific type of the terminal device is not limited in this embodiment of this application. The terminal device may be any device powered by a battery, for example, a mobile phone, a notebook computer, a wearable electronic device (such as a smartwatch), a tablet computer, an augmented reality (augmented reality, AR) device/a virtual reality (virtual reality, VR) device, or a vehicle-mounted computer device.

In the following scenarios, a voltage VB of a battery end (VBAT) drops. For example, if the terminal device is a mobile phone, because a high current needs to be consumed during photographing, the VB sharply drops, and severely, the mobile phone is instantaneously shut down without a prompt of a low battery level. Consequently, user experience is deteriorated. In addition, internal resistance exists in the battery, and the internal resistance of the battery increases as a temperature decreases. Therefore, when an ambient temperature is relatively low or a temperature of the battery is relatively low, the internal resistance of the battery increases, and the VB drops. Consequently, the mobile phone is shut down or restarted.

To resolve the foregoing problem that the terminal device is abnormally shut down or restarted, this embodiment of this application provides the power supply circuit of the terminal device. A voltage boost circuit is added to the terminal device. When it is determined that a sampling temperature is less than a preset temperature value and/or an output voltage of a battery is less than a preset voltage value, the voltage boost circuit is controlled to work. When an output voltage of the voltage boost circuit is less than an input voltage of the voltage boost circuit, the battery chip and the voltage boost circuit are controlled to simultaneously supply power to the load. The sampling temperature is a temperature of the terminal device or a temperature of the battery. Therefore, according to the power supply circuit provided in this embodiment of this application, when the temperature of the terminal device is relatively low and/or the output voltage of the battery is relatively low, the output voltage of the battery may be boosted and then a boosted voltage is provided for the load. In this way, a power demand of the load is met, and abnormal shutdown or restart caused when the load requires a high current is avoided. In addition, even if the voltage boost circuit is working, the output voltage of the voltage boost circuit may be stepped down as the load requires a higher current. In this case, the power supply circuit in this application can control both the battery chip and the voltage boost circuit to supply power to the load. In other words, two power supply paths are both conducted, and currents of the two paths are both supplied to the load. In this way, a power supply current can be increased, to meet a requirement of the load for a high current. Therefore, when the load requires a high current, the terminal device is not abnormally shut down, and can continue to be normally used, thereby further improving user experience.

FIG. 1 is a schematic diagram of a power supply circuit of a terminal device according to an embodiment of this application.

The power supply circuit of the terminal device provided in this embodiment of this application includes a battery chip 100, a voltage boost circuit 300, a controller (not shown in the figure), and a power management chip 200.

A battery end VBAT of the battery chip 100 is connected to a positive electrode of a battery BAT, and an electric energy output end VSYS of the battery chip 100 is connected to a load, for example, is connected to a system-on-a-chip SOC and another load. A voltage of the VBA is denoted as VB.

An input end of the voltage boost circuit 300 is connected to the positive electrode of the battery BAT, and an output end of the voltage boost circuit 300 is connected to the load, in other words, the output end of the voltage boost circuit 300 is connected to the electric energy output end VSYS of the battery chip 100.

The battery chip 100 may provide an output voltage of the battery for the load.

In addition, the battery chip 100 mainly controls charging and discharging of the battery BAT, for example, usually by using a switch-mode power supply. For example, when a charging power supply end VCHG charges the BAT, the battery chip 100 controls switching tubes Q1, Q2, Q3, and Q4 to be closed.

When the BAT provides electric energy for the load, Q4 is closed, and the BAT supplies power to the electric energy output end VSYS of the battery chip 100 by using Q4. A corresponding power supply voltage is denoted as VS. The power management chip 200 converts electric energy of the VSYS and then supplies power to the load. The load includes the system-on-a-chip (SOC, System-On-a-Chip) and the another load.

The power management chip 200 detects a value of the VS. When determining that the VS is less than a specified shutdown threshold or an under voltage lock out (UNTO, Under Voltage Lock Out) voltage, the power management chip 200 triggers the terminal device to be shut down or restarted.

The controller is configured to: when a sampling temperature is less than a preset temperature value and/or the output voltage of the battery is less than a first preset voltage value, control the voltage boost circuit 300 to work and control the battery chip 100 to stop supplying power to the load, to be specific, provide the output voltage of the battery for the load by using the voltage boost circuit 300; and when an output voltage of the voltage boost circuit 300 is less than an input voltage of the voltage boost circuit 300, control the battery chip 100 and the voltage boost circuit 300 to simultaneously supply power to the load. The sampling temperature is a temperature of the terminal device or a temperature of the battery.

The voltage boost circuit 300 may be a circuit that can implement a voltage boost function, for example, may be a boost circuit or a charge pump circuit. It should be noted that the voltage boost circuit 300 can boost an input voltage and then provide a boosted voltage. However, the voltage boost circuit does not necessarily boost the input voltage, but only transparently transmits the input voltage. To be specific, after passing through the voltage boost circuit, the output voltage of the battery may remain unchanged, or may be boosted. For example, the output voltage of the voltage boost circuit 300 is set to V0. When the input voltage of the voltage boost circuit 300 is less than V0, the voltage boost circuit 300 boosts the input voltage to V0 and then outputs the boosted voltage. When the input voltage of the voltage boost circuit 300 is greater than V0, the voltage boost circuit 300 transparently transmits the voltage, in other words, the input voltage remains unchanged when being output by the voltage boost circuit 300.

The sampling temperature may be obtained by a temperature sensor. The temperature sensor may collect the temperature of the terminal device or the temperature of the battery. For example, if the terminal device is a mobile phone, when the temperature sensor collects a temperature of the mobile phone, the temperature sensor may be disposed at any location on the mobile phone; or when the temperature sensor collects the temperature of the battery, the temperature sensor may be disposed at a location near the battery on the mobile phone.

A relatively low temperature and a relatively low output voltage of the battery each may cause abnormal shutdown of the terminal device. Therefore, a condition for triggering the controller to control the voltage boost circuit to work may be either thereof. To be specific, when the temperature is relatively low, the voltage boost circuit is started to work, or when the output voltage of the battery is relatively low, the voltage boost circuit is started to work. In addition, to avoid frequently starting the voltage boost circuit, the voltage boost circuit may be started only when the temperature is relatively low and the output voltage of the battery is relatively low.

A function of the voltage boost circuit 300 is to boost the input voltage and then output a boosted voltage. Because the input end of the voltage boost circuit 300 is connected to the positive electrode of the battery BAT, the voltage boost circuit 300 can boost the output voltage of the battery and then output a boosted voltage to the load.

When the voltage boost circuit 300 works, if a relatively high pulse current occurs in a running process of the terminal device, the output voltage of the voltage boost circuit 300 sharply drops, to be specific, the output voltage of the voltage boost circuit 300 is less than the input voltage of the voltage boost circuit 300. In this case, the battery chip 100 and the voltage boost circuit 300 may be controlled to simultaneously supply power to the load, to boost a power supply current and a power supply voltage, so as to prevent the terminal device from being abnormally shut down when a relatively high pulse current occurs.

If a condition for triggering the voltage boost circuit to be started to work is that the sampling temperature is less than the preset temperature value, when the sampling temperature is greater than or equal to the preset temperature value, the voltage boost circuit does not work, and only the battery chip 100 supplies power to the load. In other words, when the sampling temperature is greater than or equal to the preset temperature value, Q4 is controlled to be conducted, the voltage boost circuit is controlled not to work, and only the battery chip 100 supplies power to the load.

If a condition for triggering the voltage boost circuit to be started to work is that the output voltage of the battery is less than the first preset voltage value, when the output voltage of the battery is greater than or equal to the first preset voltage value, the voltage boost circuit does not work, and only the battery chip 100 supplies power to the load. In other words, when the output voltage of the battery is greater than or equal to the first preset voltage value, Q4 is controlled to be conducted, the voltage boost circuit is controlled not to work, and only the battery chip 100 supplies power to the load.

If a condition for triggering the voltage boost circuit to be started to work is that the sampling temperature is less than the preset temperature value and the output voltage of the battery is less than the first preset voltage value, when the sampling temperature is greater than or equal to the preset temperature value or the output voltage of the battery is greater than or equal to the first preset voltage value, the voltage boost circuit does not work, and only the battery chip 100 supplies power to the load.

Embodiment 2 of the Power Supply Circuit

In this embodiment, a voltage comparison circuit compares the input voltage with the output voltage of the voltage boost circuit.

Figure 2:
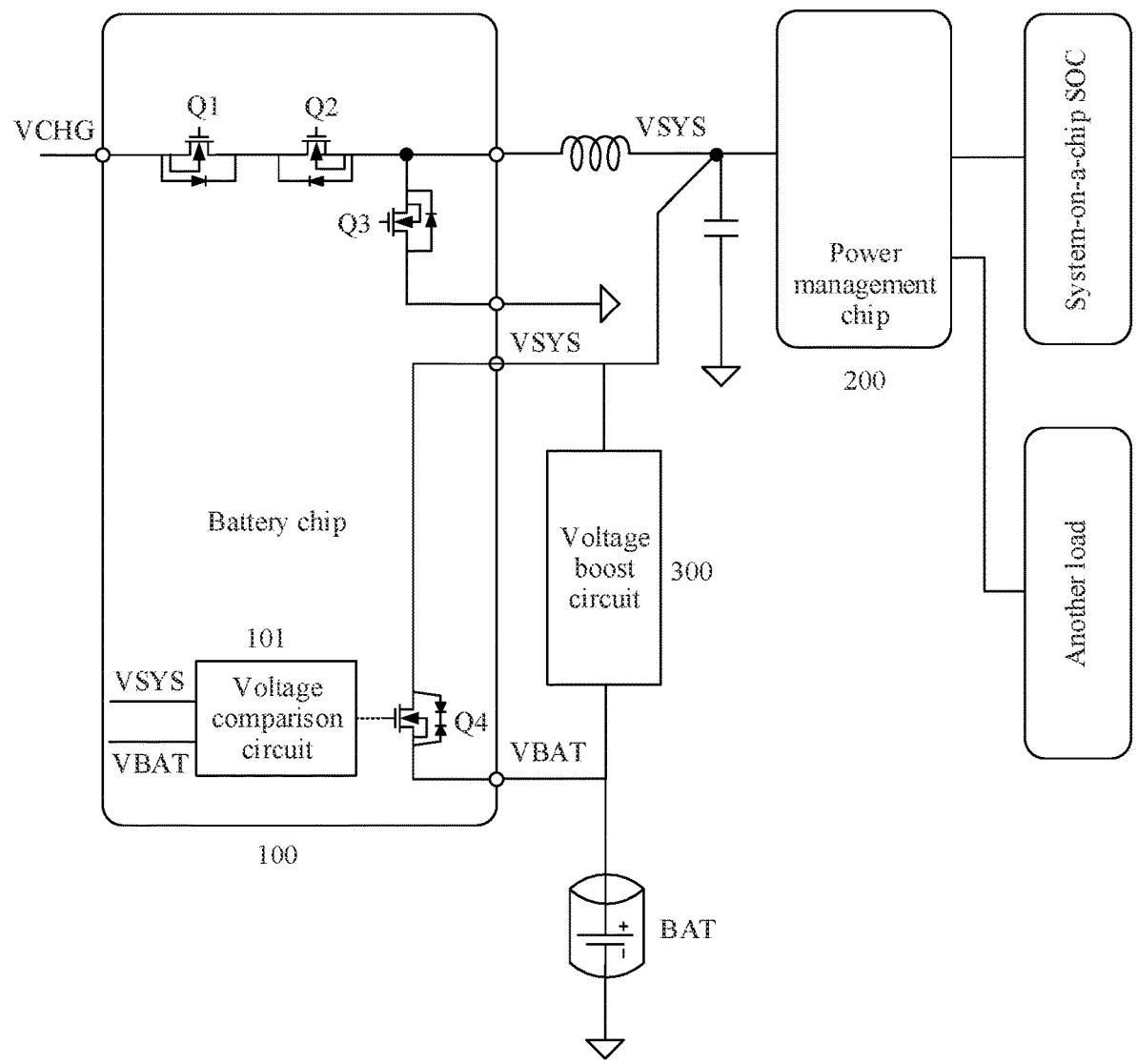
FIG. 2 is a schematic diagram of another power supply circuit of a terminal device according to an embodiment of this application.

FIG. 2 is a schematic diagram of another power supply circuit of a terminal device according to an embodiment of this application.

The power supply circuit of the terminal device provided in this embodiment includes the power supply circuit shown in FIG. 1, and further includes a voltage comparison circuit 101.

The controller is further configured to control the voltage comparison circuit 101 to work when controlling the voltage boost circuit 300 to work. In other words, the voltage comparison circuit 101 needs to work only when the voltage boost circuit 300 works.

The voltage comparison circuit 101 is configured to: compare the output voltage of the voltage boost circuit 300 with the input voltage of the voltage boost circuit 300; and send a trigger signal to the controller when determining that the output voltage of the voltage boost circuit 300 is less than the input voltage of the voltage boost circuit 300. Alternatively, the voltage comparison circuit 101 sends a trigger signal to the controller only when the output voltage of the voltage boost circuit 300 is less than the input voltage and a difference between the two voltages exceeds a first threshold.

The voltage comparison circuit 101 can obtain the difference between the output voltage and the input voltage of the voltage boost circuit 300.

The voltage comparison circuit 101 may be any circuit or chip that implements the foregoing functions. For example, the voltage comparison circuit 101 may be implemented by a comparator and a peripheral building resistor. The foregoing difference is calculated by using resistors with different resistance values.

The controller is further configured to: when receiving the trigger signal sent by the voltage comparison circuit 101, control the battery chip 100 and the voltage boost circuit 300 to simultaneously supply power to the load, to be specific, control Q4 to be conducted, and control the voltage boost circuit 300 to continue to work.

To ensure that a power supply status of the battery chip 100 is not frequently controlled and improve an anti-interference capability, in this embodiment, whether to trigger the battery chip 100 and the voltage boost circuit 300 to simultaneously supply power to the load is determined by the voltage comparison circuit 101. The voltage comparison circuit 101 sends the trigger signal to the controller only when the output voltage of the voltage boost circuit 300 is less than the input voltage of the voltage boost circuit 300. Alternatively, the voltage comparison circuit 101 sends the trigger signal to the controller only when the output voltage of the voltage boost circuit 300 is less than the input voltage of the voltage boost circuit 300 and the difference between the two voltages exceeds the first threshold.

The first threshold may be set according to a requirement. For example, the first threshold may be selected from 50 mV to 100 mV.

Figure 3:
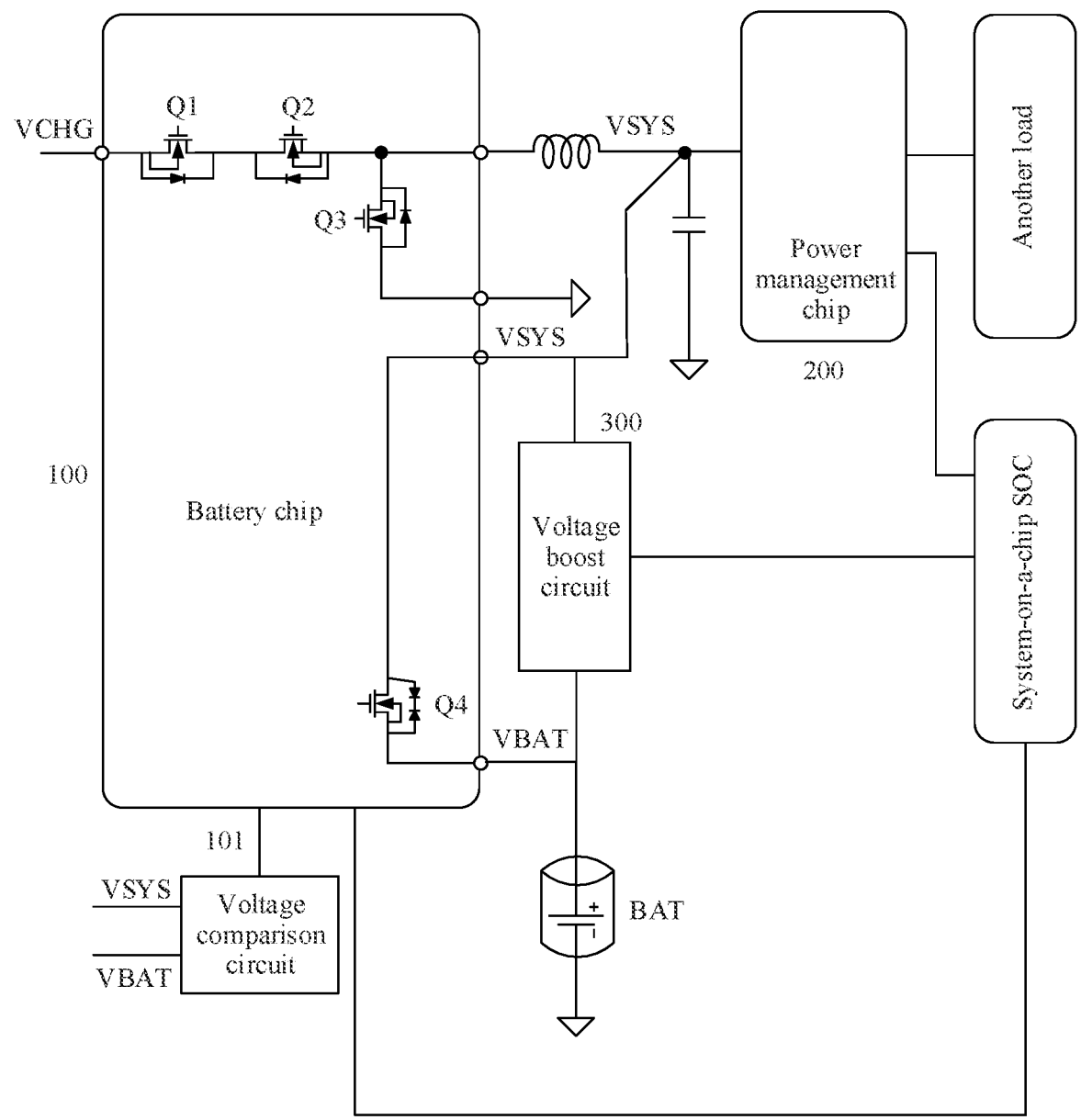
FIG. 3 is a schematic diagram of still another power supply circuit of a terminal device according to an embodiment of this application.

Whether the battery chip 100 supplies power to the load may be determined by controlling a conduction/disconnection state of an internal switching tube inside the battery chip 100. As shown in FIG. 3, the battery chip includes the switching tube Q4.

A first end of the switching tube Q4 is connected to the battery end VBAT of the battery chip 100, and a second end of the switching tube Q4 is connected to the electric energy output end VSYS of the battery chip 100.

That the controller controls the battery chip 100 to supply power to the load is specifically: the controller controls the switching tube Q4 to be closed.

Because Q4 is connected between the battery end VBAT and the electric energy output end VSYS of the battery chip 100, when Q4 is closed, the VBAT is connected to the VSYS. Therefore, the output voltage of the BAT is provided for the load by using the VBAT, Q4, and the VSYS. When Q4 is disconnected, a power supply path provided by the battery chip 100 for the load is disconnected.

Q4 is a controllable switching tube. To be specific, a conduction/disconnection state of the switching tube Q4 may be controlled by controlling a level of a control end of Q4. For example, Q4 is conducted at a high level, and Q4 is disconnected at a low level. A type of Q4 is not specifically limited in this embodiment of this application. For example, Q4 may be an MOS tube, an IGBT tube, or a BJT tube.

As shown in FIG. 2, the voltage comparison circuit 101 may be disposed inside the battery chip 100.

Alternatively, as shown in FIG. 3, the voltage comparison circuit 101 may be disposed outside the battery chip 100.

The controller may be implemented by a system-on-a-chip SOC of the terminal device. Certainly, the controller may alternatively be disposed independently of the SOC.

As shown in FIG. 3, an example in which the controller is implemented by the SOC is used. The SOC may control the voltage boost circuit 300 to work. For example, the voltage boost circuit 300 has an enabling pin, and the enabling pin may be valid at a high level. When the SOC needs to start the voltage boost circuit 300, the SOC sends a high-level signal to the enabling pin of the voltage boost circuit 300, and the voltage boost circuit 300 is started to work. On the contrary, if the SOC does not send a high-level signal to the enabling pin of the voltage boost circuit 300, the enabling pin of the voltage boost circuit 300 is at a low level by default, and does not work. In addition, when receiving the trigger signal sent by the voltage comparison circuit 101, the SOC controls Q4 to be conducted, so that the battery chip 100 and the voltage boost circuit 300 simultaneously supply power to the load. Specifically, the SOC may send a control signal to the battery chip 100, so that the battery chip 100 controls Q4 to be conducted.

Figure 4:
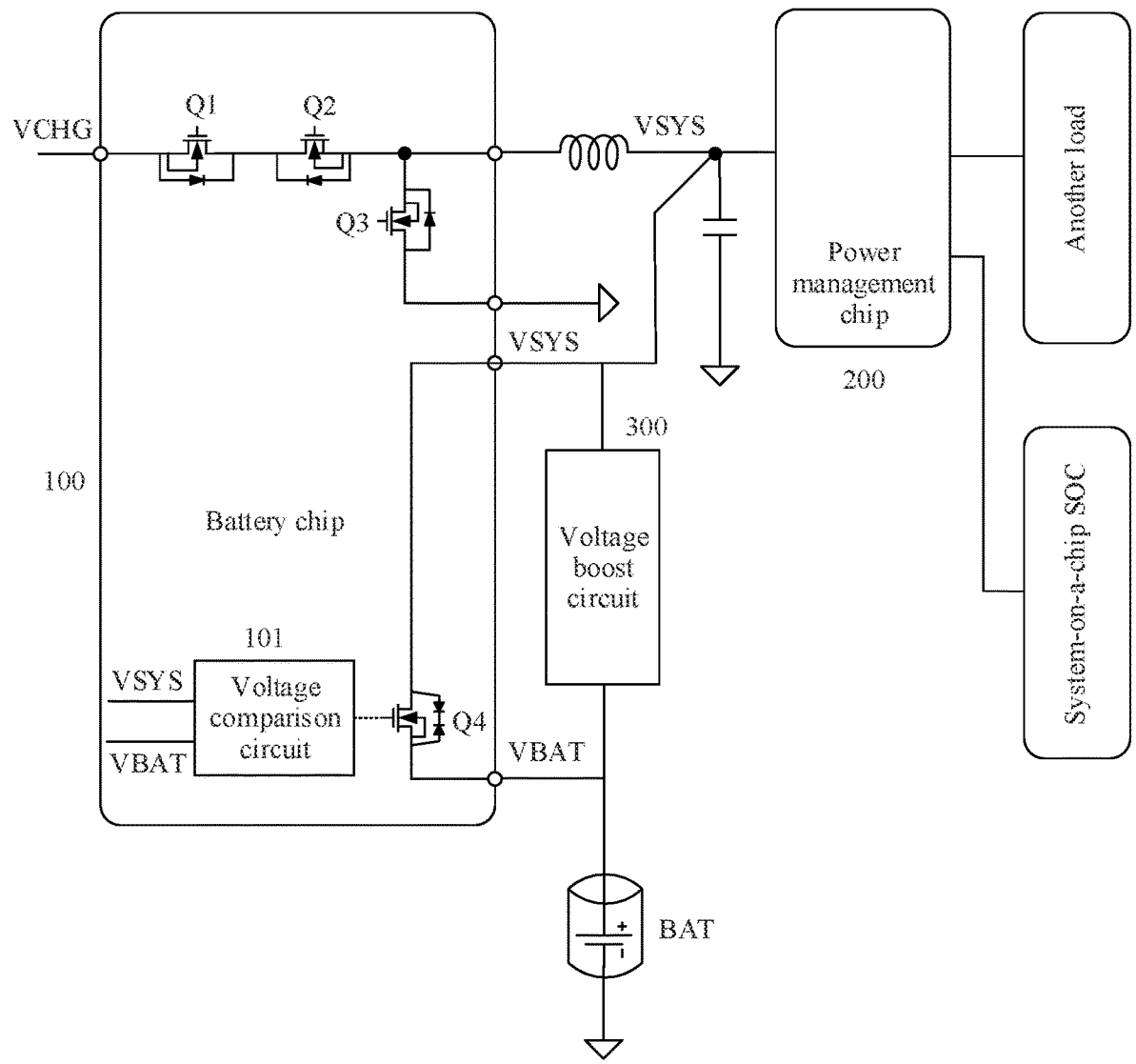
FIG. 4 is a schematic diagram in which a voltage comparison circuit is disposed inside a battery chip according to an embodiment of this application.

Likewise, as shown in FIG. 4, the comparison circuit 101 is disposed inside the battery chip 100, and the controller is implemented by the system-on-a-chip SOC.

In this embodiment, the controller is further configured to: when it is detected that a charger is inserted into the terminal device, control the battery chip 100 to supply power to the load, and control the voltage boost circuit 300 to stop working.

When it is detected that the charger is inserted into the terminal device, because the battery may be charged by an external power supply, a battery level gradually increases, and the output voltage of the battery is also gradually boosted. Therefore, the voltage boost circuit 300 may stop working, and the battery chip 100 works to provide a power supply path for the load. When the charger is inserted into the terminal device, the load is directly powered by the external power supply.

In addition, after the controller controls, when determining that the sampling temperature is less than the preset temperature value and/or the output voltage of the battery is less than the first preset voltage value, the voltage boost circuit 300 to work, and controls the battery chip 100 to stop supplying power to the load, the controller is further configured to: when a screen of the terminal device is turned off and the output voltage of the battery is greater than a second preset voltage value, control the output voltage of the voltage boost circuit to be less than or equal to the output voltage of the battery, then control the battery chip to supply power to the load, and next control the voltage boost circuit to stop working.

The second preset voltage value is less than the first preset voltage value.

The first preset voltage value is, for example, 3.6 V, and the second preset voltage value is, for example, 3.3 V.

When the screen of the terminal device is turned off, required power decreases. Therefore, even if the output voltage of the battery is less than the first preset voltage value, the voltage boost circuit 300 may be controlled to stop working and the battery chip 100 works to provide a power supply path for the load, provided that the output voltage of the battery is greater than the second preset voltage value.

The controller is further configured to control the voltage boost circuit to work when the screen of the terminal device is turned off and the output voltage of the battery is less than or equal to the second preset voltage value. Even if the required power decreases when the screen of the terminal device is turned off, the voltage boost circuit still needs to work when the output voltage of the battery is less than or equal to the first preset voltage value. Otherwise, the terminal device is shut down or restarted.

In addition, the controller is further configured to control the terminal device to be shut down when the output voltage of the battery is less than or equal to a third preset voltage value. The third preset voltage value is less than the second preset voltage value.

For example, the third preset voltage value is 3 V. In this case, if the output voltage of the battery is less than or equal to 3 V, it indicates that the battery level is very low, the battery level is insufficient to maintain normal working of the terminal device, and the terminal device needs to be shut down.

It should be noted that the first preset voltage value, the second preset voltage value, and the third preset voltage value in the foregoing embodiment are ranked in descending order. However, specific voltage values may be selected based on a type of the terminal device and a type of the battery. This is not specifically limited in this embodiment.

When the terminal device just switches from a power supply path provided by the battery chip to a power supply path provided by the voltage boost circuit, if the output voltage of the voltage boost circuit is relatively high, but the power supply path provided by the battery chip is not disconnected, the relatively high output voltage may be backflowed into the battery chip. To avoid such a backflow, that the controller controls the voltage boost circuit to start to work and controls the battery chip to stop supplying power to the load may specifically include:

first controlling the output voltage of the voltage boost circuit to be less than or equal to the output voltage of the battery, then controlling the battery chip to stop supplying power to the load, and next controlling the output voltage of the voltage boost circuit to be a fourth preset voltage value.

The fourth preset voltage value is less than the first preset voltage value.

The fourth preset voltage value and the second preset voltage value may be equal, for example, both are 3.3 V. Alternatively, the fourth preset voltage value and the second preset voltage value may be unequal, and may be specifically set according to an actual requirement.

To start the voltage boost circuit in time when a battery voltage is relatively low, the voltage boost circuit needs to be started when the output voltage of the battery is less than the first preset voltage value. In this embodiment of this application, starting the voltage boost circuit may be understood as enabling the voltage boost circuit. If the voltage boost circuit is started only when the output voltage of the battery drops to the fourth preset voltage value, a power supply delay is caused. The fourth preset voltage value is usually a standard voltage required by the load, and the output voltage of the battery gradually drops as a power supply time is prolonged. After the voltage boost circuit is started, if the output voltage of the battery (that is, the input voltage of the voltage boost circuit) is greater than the fourth preset voltage value, the voltage boost circuit does not boost the output voltage of the battery, but transparently transmits the output voltage of the battery. In this case, a voltage that is actually output by the voltage boost circuit is greater than the fourth preset voltage value. After the output voltage of the battery is less than the fourth preset voltage value, the voltage boost circuit boosts the output voltage of the battery to the fourth preset voltage value, and then outputs the boosted voltage. In this case, the voltage that is actually output by the voltage boost circuit is equal to the fourth preset voltage value.

Controlling the output voltage of the voltage boost circuit to he less than the output voltage of the battery may be specifically that the output voltage of the voltage boost circuit is equal to the output voltage of the battery minus a preset threshold. For example, the preset threshold may be 150 mV. A specific preset threshold is not specifically limited in this embodiment, and may be selected based on a type of the battery chip.

The power supply circuit may further include a power management chip 200.

The power management chip 200 is configured to: determine that the sampling temperature is less than the preset temperature value and/or the output voltage of the battery is less than the first preset voltage value; and send the determining result to the controller.

In other words, the power management chip 200 determines whether the temperature is relatively low and whether the output voltage of the battery is relatively low.

The power management chip 200 may include a direct current-direct current DC-DC conversion circuit and a low dropout regulator (LDO, Low Dropout Regulator). The LDO is configured to stabilize a voltage and provide the voltage for the SOC. For an LDO that directly supplies power by using the voltage VS of the VSYS, for example, a power supply of an embedded multimedia card (eMMC, Embedded Multi Media Card), a problem that an output voltage of the LDO drops because the voltage of the VSYS drops does not occur by using the power supply circuit provided in this embodiment of this application, so as to further improve reliability of power supply by the LDO is further improved. On the premise that the reliability of power supply by the LDO is ensured, a circuit such as a buck-boost circuit or a boost circuit does not need to be added to an input end of the LDO, so as to reduce costs of the entire power supply circuit.

According to the power supply circuit provided in this embodiment, the switching tub Q4 in the existing battery chip of the terminal device may be used to control the conduction/disconnection state of Q4 to control the power supply path of the battery chip, and the power supply path of the voltage boost circuit may be controlled by using the existing SOC of the terminal device. In this way, only one voltage boost circuit is added relative to a hardware facility of the existing terminal device. Therefore, costs are low, and the hardware is changed slightly, thereby facilitating popularization and application of the technical solution.

The battery chip and the voltage boost circuit in the power supply circuit provided in this embodiment each provide a power supply path under active control. For example, the switching tube Q4 in the battery chip 100 needs to be controlled to be closed. In addition, when the output voltage of the battery is relatively high, in other words, the voltage boost circuit does not need to work, the voltage boost circuit also needs to be controlled to stop working. The following provides another implementation. Whether the boost voltage boosts the output voltage of the battery and then outputs a boosted voltage can be controlled. In addition, when two power supply paths need to be provided, Q4 does not need to be controlled to be closed, but the two power supply paths are automatically conducted.

According to the power supply circuit provided in the foregoing embodiment, the controller needs to control working states of the battery chip and the voltage boost circuit. The following provides a power supply circuit, so that switching between power supply paths can be automatically performed based on an output voltage of a battery without a need of control. This is simple and convenient, and further reduces control costs. A difference between a voltage boost circuit in this embodiment and the voltage boost circuit in the foregoing two embodiments lies in that a bypass circuit is added.

Embodiment 3 of the Power Supply Circuit

Figure 5:
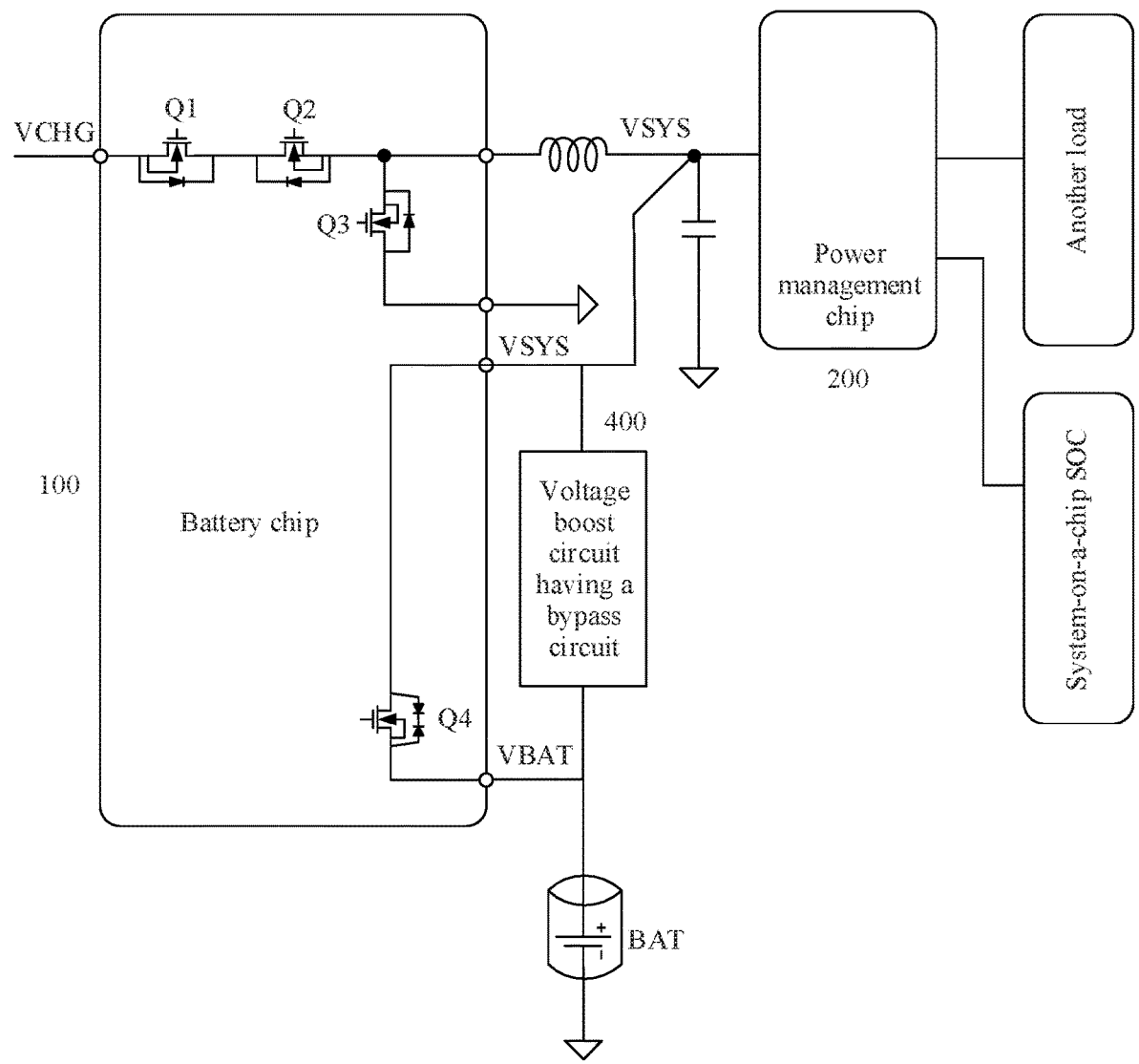
FIG. 5 is a schematic diagram of yet another power supply circuit of a terminal device according to an embodiment of this application.

FIG. 5 is a schematic diagram of yet another power supply circuit of a terminal device according to an embodiment of this application.

The power supply circuit of the terminal device provided in this embodiment includes a voltage boost circuit 400 having a bypass circuit, a battery chip 100, and a controller.

A battery end VBAT of the battery chip 100 is connected to a positive electrode of a battery BAT, and an electric energy output end VSYS of the battery chip 100 is connected to a load. The battery chip 100 is configured to provide an output voltage of the battery BAT for the load.

The voltage boost circuit 400 having a bypass includes a voltage boost circuit and a bypass circuit. An input end of the voltage boost circuit is connected to the positive electrode of the battery, and an output end of the voltage boost circuit is connected to the load. A first end of the bypass circuit is connected to the input end of the voltage boost circuit, and a second end of the bypass circuit is connected to the output end of the voltage boost circuit. A conducting state of the voltage boost circuit is complementary to that of the bypass circuit.

That a conducting state of the voltage boost circuit is complementary to that of the bypass circuit means that the bypass circuit is not conducted when the voltage boost circuit is conducted, or the voltage boost circuit is not conducted when the bypass circuit is conducted. However, a non-conducting state of the voltage boost circuit is not complementary to that of the bypass circuit. In other words, both the voltage boost circuit and the bypass circuit may be non-conducted simultaneously.

The controller is configured to: when a sampling temperature is less than a preset temperature value and/or the output voltage of the battery is less than a first preset voltage value, control the voltage boost circuit to work and control the battery chip to stop supplying power to the load. When an output voltage of the voltage boost circuit is less than an input voltage of the voltage boost circuit, the bypass circuit is automatically conducted to supply power to the load. The sampling temperature is a temperature of the terminal device or a temperature of the battery.

When the voltage boost circuit works, if a relatively high pulse current occurs in a running process of the terminal device, the output voltage of the voltage boost circuit sharply drops, to be specific, the output voltage of the voltage boost circuit is less than the input voltage of the voltage boost circuit. In this case, because an input voltage of the bypass circuit is greater than an output voltage of the bypass circuit, the bypass circuit is automatically conducted, to boost a power supply current and a power supply voltage, so as to prevent the terminal device from being abnormally shut down when a relatively high pulse current occurs. The voltage boost circuit is automatically disconnected when the bypass circuit is conducted.

Specifically, the bypass circuit may be implemented by a dedicated chip. In other words, the chip includes both the voltage boost circuit and the bypass circuit.

Certainly, the power supply circuit may also be implemented by building the voltage boost circuit and the bypass circuit. For example, the input end and the output end of the voltage boost circuit are connected to a diode in parallel. To be specific, an anode of the diode is connected to the input end of the voltage boost circuit, and a cathode of the diode is connected to the output end of the voltage boost circuit. Based on a basic attribute of forward conduction and reverse cutoff of the diode, when the input voltage of the voltage boost circuit is greater than the output voltage of the voltage boost circuit and a voltage difference exceeds a PN junction voltage drop of the diode, the diode is conducted. When the diode is conducted, the voltage boost circuit is bypassed. To be specific, the output voltage of the battery is directly output to the VSYS end through the diode, instead of passing through the voltage boost circuit.

When the input voltage of the voltage boost circuit is less than or equal to the output voltage of the voltage boost circuit, the voltage boost circuit works to boost the output voltage of the battery and provide a boosted voltage for the VSYS. In this case, the boosted voltage is greater than the output voltage of the battery. Therefore, it is equivalent to that a voltage VB of the VSYS is greater than a voltage VS of the VBAT. Therefore, the diode is reversely cut off and is not conducted. To be specific, the output voltage of the battery does not pass through a branch in which the diode is located.

If a condition for triggering the voltage boost circuit to be started to work is that the sampling temperature is less than the preset temperature value, when the sampling temperature is greater than or equal to the preset temperature value, the voltage boost circuit does not work, and only the battery chip 100 supplies power to the load.

If a condition tier triggering the voltage boost circuit to be started to work is that the output voltage of the battery is less than the first preset voltage value, when the output voltage of the battery is greater than or equal to the first preset voltage value, the voltage boost circuit does not work, and only the battery chip 100 supplies power to the load.

If a condition for triggering the voltage boost circuit to be started to work is that the sampling temperature is less than the preset temperature value and the output voltage of the battery is less than the first preset voltage value, when the sampling temperature is greater than or equal to the preset temperature value or the output voltage of the battery is greater than or equal to the first preset voltage value, the voltage boost circuit does not work, and only the battery chip 100 supplies power to the load.

According to the power supply circuit provided in this embodiment, the voltage boost circuit 400 having a bypass circuit is added to the terminal device. When it is determined that the sampling temperature is less than the preset temperature value and/or the output voltage of the battery is less than the preset voltage value, the voltage boost circuit is controlled to work. When the output voltage of the voltage boost circuit is less than the input voltage of the voltage boost circuit, the bypass circuit is automatically conducted to provide a power supply path for the load. Therefore, according to the power supply circuit provided in this embodiment of this application, when the temperature of the terminal device is relatively low and/or the output voltage of the battery is relatively low, the output voltage of the battery may be boosted and then a boosted voltage is provided for the load. In this way, a power demand of the load is met, and abnormal shutdown or restart caused when the load requires a high current is avoided. In addition, even if the voltage boost circuit is working, the output voltage of the voltage boost circuit may be stepped down as a high pulse current occurs during power use. In this case, because the output voltage of the voltage boost circuit drops and is less than the input voltage of the voltage boost circuit, the bypass circuit is automatically conducted, to meet a requirement of the load for a high current. Therefore, when the load requires a high current, the terminal device is not abnormally shut down, and can continue to be normally used, thereby further improving user experience.

The power management chip 200 may include a direct current-direct current DC-DC conversion circuit and a low dropout regulator (LDO, Low Dropout Regulator). The LDO is configured to stabilize a voltage and provide the voltage for the SOC. For an LDO that directly supplies power by using the voltage VS of the VSYS, for example, a power supply of an embedded multimedia card (eMMC, Embedded Multi Media Card), a problem that an output voltage of the LDO drops because the voltage of the VSYS drops does not occur by using the power supply circuit provided in this embodiment of this application, so as to further improve reliability of power supply by the LDO. On the premise that the reliability of power supply by the LDO is ensured, a circuit such as a buck-boost circuit or a boost circuit does not need to be added to an input end of the LDO, so as to reduce costs of the entire power supply circuit.

Embodiment 4 of the Power Supply Circuit

Figure 6:
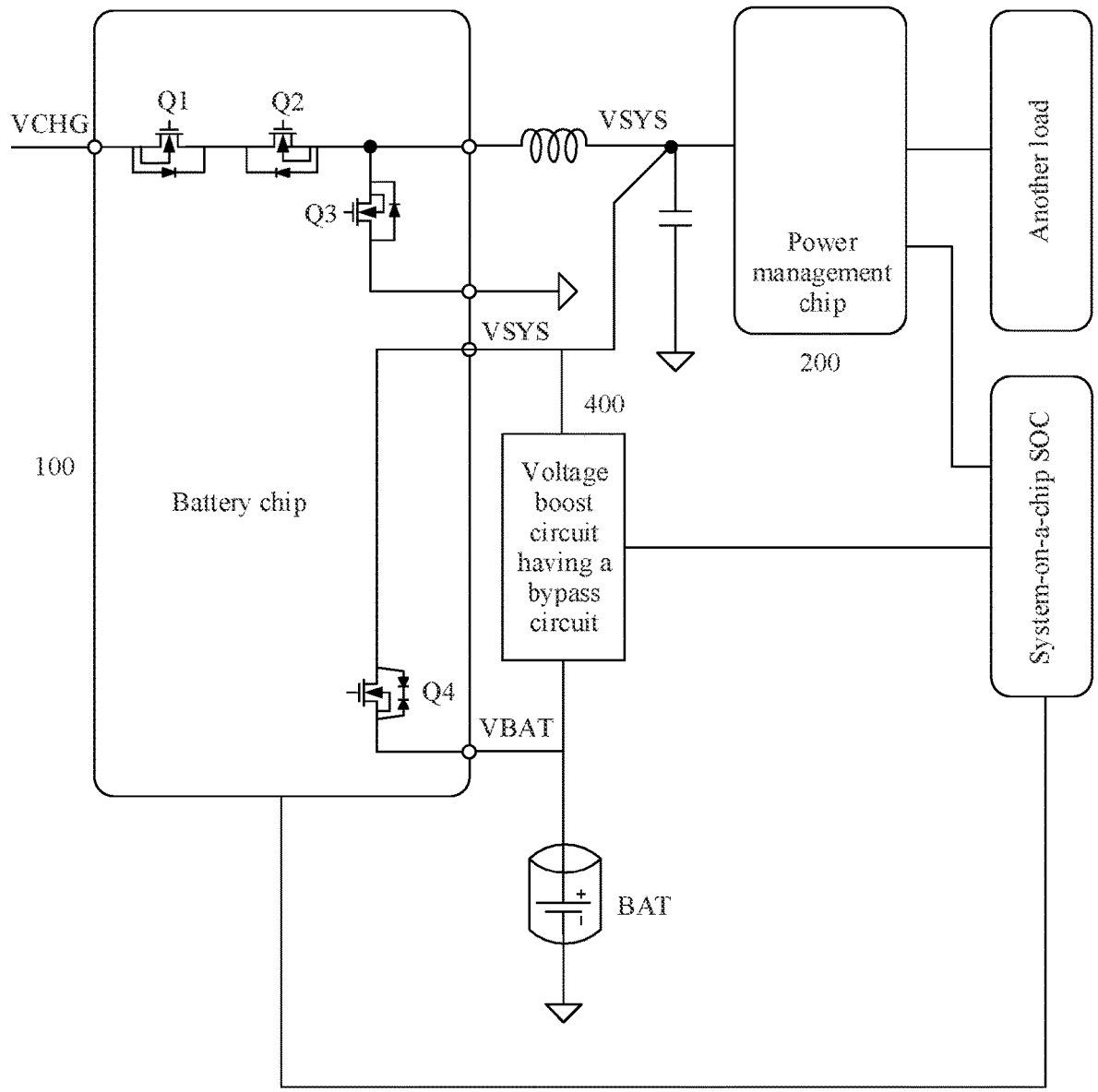
FIG. 6 is a schematic diagram of still yet another power supply circuit of a terminal device according to an embodiment of this application.

FIG. 6 is a schematic diagram of still yet another power supply circuit of a terminal device according to an embodiment of this application.

The controller may be implemented by a system-on-a-chip SOC of the terminal device. Certainly, the controller may alternatively be disposed independently of the SOC.

As shown in FIG. 6, an example in which the controller is implemented by the SOC is used. The SOC is configured to control the voltage boost circuit 400 having a bypass circuit to work. For example, the voltage boost circuit 400 having a bypass circuit has an enabling pin, and the enabling pin may be valid at a high level. When the SOC needs to start the voltage boost circuit 400 having a bypass circuit, the SOC sends a high-level signal to the enabling pin of the voltage boost circuit 400 having a bypass circuit, and the voltage boost circuit 400 having a bypass circuit is started to work. On the contrary, if the SOC does not send a high-level signal to the enabling pin of the voltage boost circuit 400 having a bypass circuit, the enabling pin of the voltage boost circuit 400 having a bypass circuit is at a low level by default, and does not work.

The power supply circuit provided in this embodiment does not need a voltage comparison circuit. Instead, when a voltage VS of a VSYS is less than a voltage VB of a VBAT, the voltage boost circuit is conducted, otherwise, the bypass circuit is conducted. To be specific, once the voltage boost circuit 400 having a bypass circuit is enabled, conducting states of the voltage boost circuit and the bypass circuit may be automatically switched based on a voltage of an input end and a voltage of an output end without a need of control.

When the terminal device just switches from a power supply path provided by the battery chip to a power supply path provided by the voltage boost circuit, if the output voltage of the voltage boost circuit is relatively high, but the power supply path provided by the battery chip is not disconnected, the relatively high output voltage may be backflowed into the battery chip. To avoid such a backflow, that the controller controls the voltage boost circuit to start to work and controls the battery chip to stop supplying power to the load may specifically include:

first controlling the output voltage of the voltage boost circuit to be less than or equal to the output voltage of the battery, then controlling the battery chip to stop supplying power to the load, and next controlling the output voltage of the voltage boost circuit to be a fourth preset voltage value.

The fourth preset voltage value is less than the first preset voltage value.

The fourth preset voltage value and the second preset voltage value may be equal, for example, both are 3.3 V. Alternatively, the fourth preset voltage value and the second preset voltage value may be unequal, and may be specifically set according to an actual requirement.

To start the voltage boost circuit in time when a battery voltage is relatively low, the voltage boost circuit needs to be started when the output voltage of the battery is less than the first preset voltage value. If the voltage boost circuit is started only when the output voltage of the battery is equal to the fourth preset voltage value, a power supply delay is caused. The fourth preset voltage value is usually a standard voltage required by the load, and the output voltage of the battery gradually drops as a power supply time is prolonged. After the voltage boost circuit is started, if the output voltage of the battery is greater than the output voltage of the voltage boost circuit, the bypass circuit is conducted, and the voltage boost circuit does not supply power. In this case, the load is powered by the battery. The voltage boost circuit supplies power until the output voltage of the battery is less than the fourth preset voltage value.

Device Embodiment

Based on the power supply circuits provided in the foregoing embodiments, this embodiment of this application further provides a terminal device. The terminal device may be a mobile terminal device such as a mobile phone or an iPad, or may be another fixed terminal device that uses a battery as a power supply. The terminal device includes the power supply circuit provided in any one of the foregoing embodiments. The power supply circuit is configured to provide electric energy of the battery for a load in the terminal device.

When it is determined that a sampling temperature is less than a preset temperature value and/or an output voltage of the battery is less than a preset voltage value, the voltage boost circuit is controlled to work. When an output voltage of the voltage boost circuit is less than an input voltage of the voltage boost circuit, the bypass circuit is automatically conducted to provide a power supply path for the load. The sampling temperature is a temperature of the terminal device or a temperature of the battery. Therefore, according to the power supply circuit provided in this embodiment of this application, when the temperature of the terminal device is relatively low and/or the output voltage of the battery is relatively low, the output voltage of the battery may be boosted and then a boosted voltage is provided for the load, in this way, a power demand of the load is met, and abnormal shutdown or restart caused when the load requires a high current is avoided.

Method Embodiment 1

Based on the power supply circuit and the terminal device that are provided in the foregoing embodiments, this embodiment of this application further provides a power supply method for a terminal device. The following provides detailed descriptions with reference to the accompanying drawings.

Figure 7A:
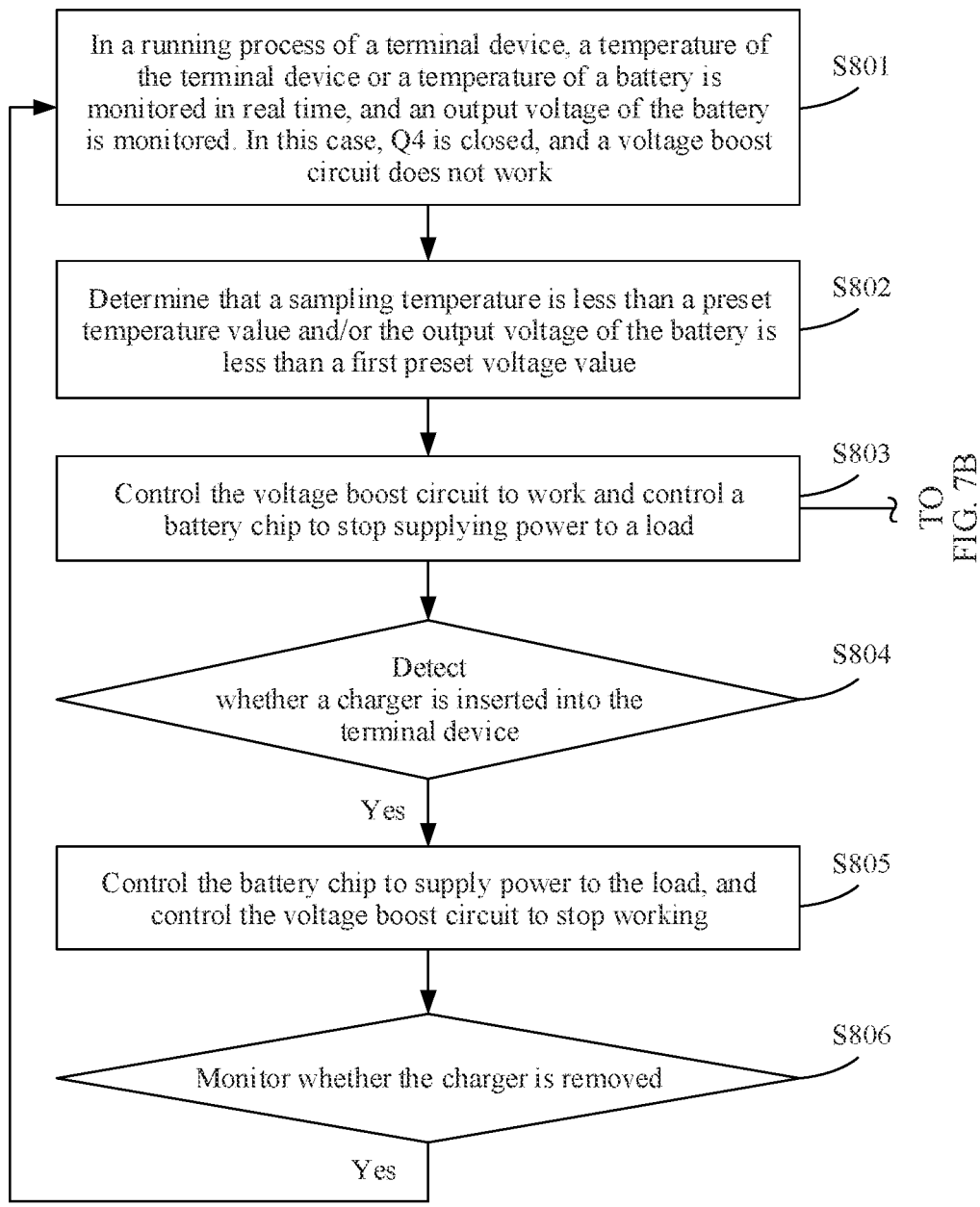
FIG. 7A and FIG. 7B are a flowchart of a power supply method according to an embodiment of this application.
Figure 7B:
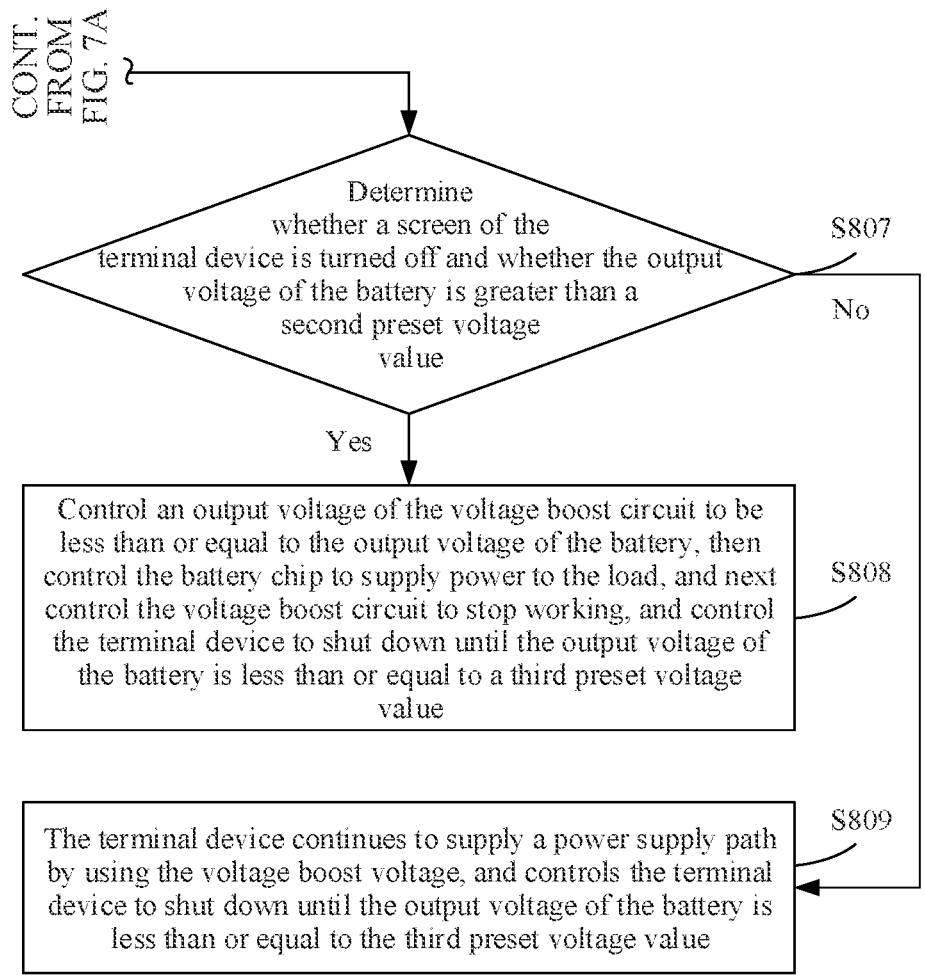

FIG. 7A and FIG. 7B are a flowchart of a power supply manner for a terminal device according to an embodiment of this application.

The power supply method for the terminal device provided in this embodiment is applied to a power supply circuit. For the power supply circuit, refer to the power supply circuits shown in FIG. 1 to FIG. 4.

The method includes the following steps.

S801: In a running process of the terminal device, a temperature of the terminal device or a temperature of the battery may be monitored in real time, and/or an output voltage of the battery may also be monitored. In this case, Q4 is closed, and the voltage boost circuit does not work.

S802: Perform S803 when it is determined that a sampling temperature is less than a preset temperature value and/or the output voltage of the battery is less than a first preset voltage value. To be specific, a condition for triggering the voltage boost circuit to be started to work may be determining only a temperature, or may be determining only a voltage, or may be determining both a temperature and a voltage.

For example, in a process in which Q4 is conducted to supply power, when only the temperature is monitored, the voltage boost circuit may be started when it is determined that the temperature is less than the preset temperature value. When the voltage boost circuit is a boost circuit, in other words, an enabling boost circuit, a chip of the boost circuit has an enabling pin. In the process in which Q4 is conducted to supply power, when both the temperature and the voltage are determined, the voltage boost circuit may be started when it is determined that the temperature is less than the preset temperature value and it is determined that the voltage is also less than the first preset voltage value. Alternatively, the voltage may be first determined, and then the temperature is determined. An occasion for determining the voltage and the temperature is not limited in this embodiment of this application.

The preset temperature may be set based on a specific environment in which the terminal device is located, for example, may be set to 0° C. The first preset voltage value may be set based on a type of the terminal device, for example, may be set to 3.6 V.

S803: Control the voltage boost circuit to work and control the battery chip to stop supplying power to the load. Specifically, an output voltage of the voltage boost circuit is first controlled to be less than or approximate to (for example, equal to or slightly greater than) the output voltage of the battery. For example, the output voltage of the voltage boost circuit is controlled to be equal to the output voltage of the battery minus a threshold voltage. The threshold voltage may be selected according to a requirement, for example, may be 150 mV. Alternatively, an output voltage of the voltage boost circuit is controlled to be equal to the output voltage of the battery, then the battery chip is controlled to stop supplying power to the load, and next the output voltage of the voltage boost circuit is controlled to be a fourth preset voltage value. The fourth preset voltage value may be less than or equal to the first preset voltage value, and the fourth preset voltage value may be greater than or equal to a current output voltage of the battery. The fourth preset voltage value may alternatively be selected according to an actual requirement, for example, may be 3.3 V.

In this case, a power supply path is provided by the voltage boost circuit for the terminal device.

S804: Detect whether a charger is inserted into the terminal device, and if yes, perform S805.

S805: Control Q4 to be closed, to be specific, control the battery chip to supply power to the load, and control the voltage boost circuit to stop working. In this case, a power supply path is provided by the battery chip for the load of the terminal device.

S806: Return to S801 when it is detected that the charger is removed.

After S803, the method further includes S807. To be specific, after the voltage boost circuit is controlled to work and the battery chip is controlled to stop supplying power to the load, the method may further include S807.

S807: Determine whether a screen of the terminal device is turned off and whether the output voltage of the battery is greater than a second preset voltage value; and if the screen is turned off and the output voltage of the battery is greater than the second preset voltage value, perform S808, or if the screen is not turned off, or if the screen is turned off but the output voltage of the battery is less than or equal to the second preset voltage value, perform S809. It should be noted that, in S807, if it is determined that the screen of the terminal device is not turned off, S809 may be directly performed without determining whether the output voltage of the battery is greater than the second preset voltage value.

The second preset voltage value may be se according to an actual requirement, for example, may be 3.3 V.

S808: Control the output voltage of the voltage boost circuit to be less than or equal to the output voltage of the battery, then control the battery chip to supply power to the load, in other words, close Q4, and next control the voltage boost circuit to stop working, to be specific, disable an enabling signal of the voltage boost circuit. In this case, a power supply path is provided by the battery chip for the terminal device. In this case, the power supply path may be provided by the battery chip all the time, until the terminal device is controlled to be shut down when the output voltage of the battery is less than or equal to a third preset voltage value. The third preset voltage value is less than the second preset voltage value. Alternatively, a power supply path may be first provided by the battery chip, and then the output voltage of the battery continues to be monitored. When the output voltage of the battery is less than the second preset voltage value, a power supply path may be provided by the voltage boost circuit, and the battery chip stops supplying power to the load.

S809: The power supply path continues to be provided by the boost voltage for the terminal device, until the terminal device is controlled to be shut down when the output voltage of the battery is less than or equal to the third preset voltage value, where the third preset voltage value is less than the second preset voltage value.

The third preset voltage value may be set according to an actual requirement, for example, may be 3 V. To be specific, when the output voltage of the battery is less than or equal to 3 V, the terminal device is controlled to be shut down.

The foregoing preset voltage values and thresholds may be selected based on an actual requirement. Values in the foregoing embodiments of this application are merely examples for description, and may have a plurality of variations.

Method Embodiment 2

Figure 8:
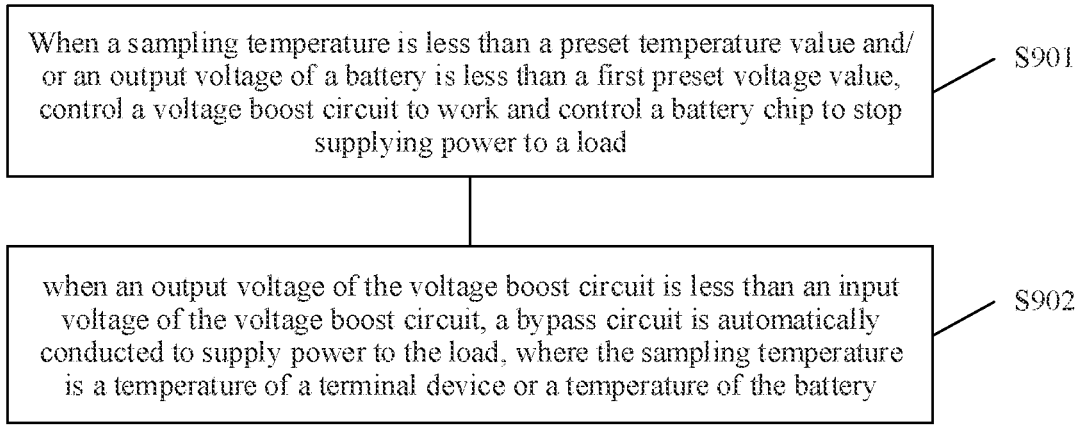
FIG. 8 is a flowchart of another power supply method according to an embodiment of this application.

FIG. 8 is a flowchart of another power supply method for a terminal device according to an embodiment of this application.

The power supply method for the terminal device provided in this embodiment is applied to a power supply circuit. For the power supply circuit, refer to the power supply circuits shown in FIG. 5 and FIG. 6.

The method includes the following steps:

S901: When a sampling temperature is less than a preset temperature value and/or an output voltage of the battery is less than a first preset voltage value, control the voltage boost circuit to work and control the battery chip to stop supplying power to the load.

S902: When an output voltage of the voltage boost circuit is less than an input voltage of the voltage boost circuit, the bypass circuit is automatically conducted to supply power to the load, where the sampling temperature is a temperature of the terminal device or a temperature of the batter.

In addition, the method further includes: when it is detected that a charger is inserted into the terminal device, controlling the battery chip to supply power to the load, and controlling the voltage boost circuit to stop working.

When a screen of the terminal device is turned off and the output voltage of the battery is greater than a second preset voltage value, the output voltage of the voltage boost circuit is controlled to be less than or equal to the output voltage of the battery, then the battery chip is controlled to supply power to the load, and next the voltage boost circuit is controlled to stop working.

The second preset voltage value is less than the first preset voltage value.

When the screen of the terminal device is turned off and the output voltage of the battery is less than or equal to the second preset voltage value, the voltage boost circuit is controlled to work.

When the output voltage of the battery is less than or equal to a third preset voltage value, the terminal device is controlled to be shut down.

The third preset voltage value is less than the second prose(voltage value.

The controlling the voltage boost circuit to work and controlling the battery chip to stop supplying power to the load may specifically include:

first controlling the output voltage of the voltage boost circuit to be less than or approximate to (for example, equal to or slightly greater than) the output voltage of the battery, then controlling the battery chip to stop supplying power to the load, and next controlling the output voltage of the voltage boost circuit to be a fourth preset voltage value.

The fourth preset voltage value is less than the first preset voltage value.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A power supply circuit for a terminal device, the power supply circuit comprising:
a battery chip comprising:
a battery end configured to couple to a positive electrode of a battery; and
an electric energy output end configured to couple to a load and to provide an output voltage of the battery to the load;
a voltage boost circuit comprising:
an input end configured to couple to the positive electrode; and
an output end configured to couple to the load,
wherein the voltage boost circuit is configured to:
boost an input voltage to obtain a boosted voltage; and
output the boosted voltage; and
a controller coupled to the voltage boost circuit and the battery chip and configured to:
control the voltage boost circuit to work and the battery chip to stop supplying power to the load when a sampling temperature is less than a preset temperature value or the output voltage is less than a first preset voltage value, wherein the sampling temperature is either a first temperature of the terminal device or a second temperature of the battery; and
control the battery chip and the voltage boost circuit to simultaneously supply the power to the load when the boosted voltage is less than the input voltage.

2. The power supply circuit of claim 1, further comprising a voltage comparison circuit coupled to the controller, wherein the controller is further configured to control the voltage comparison circuit to work when controlling the voltage boost circuit to work, wherein the voltage comparison circuit is configured to:
compare the boosted voltage with the input voltage; and
send a trigger signal to the controller when the boosted voltage is less than the input voltage, and
wherein the controller is further configured to:
receive the trigger signal; and
further control the battery chip and the voltage boost circuit to simultaneously supply the power to the load based on the trigger signal.

3. The power supply circuit of claim 2, wherein the voltage comparison circuit is disposed inside the battery chip.

4. The power supply circuit of claim 2, wherein the battery chip comprises a switching tube comprising;
a first end coupled to the battery end; and
a second end coupled to the electric energy output end,
wherein the controller is further configured to control the switching tube to be closed.

5. The power supply circuit of claim 1, wherein the controller is further configured to:
detect that a charger is inserted into the terminal device;
control, based on detecting that the charger is inserted into the terminal device, the battery chip to supply power to the load; and
control, based on detecting that the charger is inserted into the terminal device, the voltage boost circuit to stop working.

6. The power supply circuit of claim 1, wherein after controlling the voltage boost circuit to work and the battery chip to stop supplying the power to the load, and when a screen of the terminal device is turned off and the output voltage is greater than a second preset voltage value, the controller is further configured to:
  control the boosted voltage to be less than or equal to the output voltage;
  control the battery chip to supply the power to the load; and
  control the voltage boost circuit to stop working,
  wherein the second preset voltage value is less than the first preset voltage value.

7. The power supply circuit of claim 6, wherein after controlling the voltage boost circuit to stop working, and when the screen of the terminal device is turned off and the output voltage is less than or equal to the second preset voltage value, the controller is further configured to:
  control the voltage boost circuit to work; and
  control the battery chip to stop supplying the power to the load.

8. The power supply circuit of claim 6, wherein the controller is further configured to control the terminal device to be shut down when the output voltage is less than or equal to a third preset voltage value, and wherein the third preset voltage value is less than the second preset voltage value.

9. The power supply circuit of claim 1, wherein the controller is further configured to:
  control the boosted voltage to be less than or equal to the output voltage;
  control the battery chip to stop supplying the power to the load; and
  control the boosted voltage to be a fourth preset voltage value that is less than the first preset voltage value.

10. The power supply circuit of claim 1, wherein the voltage boost circuit is either a boost circuit or a charge pump circuit.

11. The power supply circuit of claim 1, further comprising a power management chip coupled to the controller and configured to:
  determine that the sampling temperature is less than the preset temperature value or the output voltage is less than the first preset voltage value to obtain a determining result; and
  send the determining result to the controller.

12. The power supply circuit of claim 1, further comprising the terminal device, and wherein the controller is a system-on-a-chip of the terminal device.

13. A power supply method for a terminal device, wherein the power supply method comprises:
  controlling, by a controller of the terminal device, a voltage boost circuit having an input end coupled to a positive electrode of a battery and an output end coupled to a load of the terminal device to work and a battery chip having a first end coupled to the positive electrode and second end coupled to the load to stop supplying power to the load when a sampling temperature is less than a preset temperature value or a first output voltage of the battery is less than a first preset voltage value, wherein the sampling temperature is a first temperature of the terminal device or a second temperature of the battery; and
  controlling, in a working process of the voltage boost circuit, the battery chip and the voltage boost circuit to simultaneously supply the power to the load when a second output voltage of the voltage boost circuit is less than an input voltage of the voltage boost circuit.

* * * * *

UNITED STATES PATENT AND TRADEMARK OFFICE
CERTIFICATE OF CORRECTION

| | | |
|---|---|---|
| PATENT NO. | : 11,949,272 B2 | Page 1 of 1 |
| APPLICATION NO. | : 17/259045 | |
| DATED | : April 2, 2024 | |
| INVENTOR(S) | : Yupeng Qiu et al. | |

It is certified that error appears in the above-identified patent and that said Letters Patent is hereby corrected as shown below:

On the Title Page

(71) Applicant: "Honor Device Co., Ltd., Guandong (CN)" should read "Honor Device Co., Ltd., Shenzhen (CN)"

Signed and Sealed this
Fourteenth Day of May, 2024

*Katherine Kelly Vidal*

Katherine Kelly Vidal
*Director of the United States Patent and Trademark Office*